United States Patent Office 3,447,717
Patented June 3, 1969

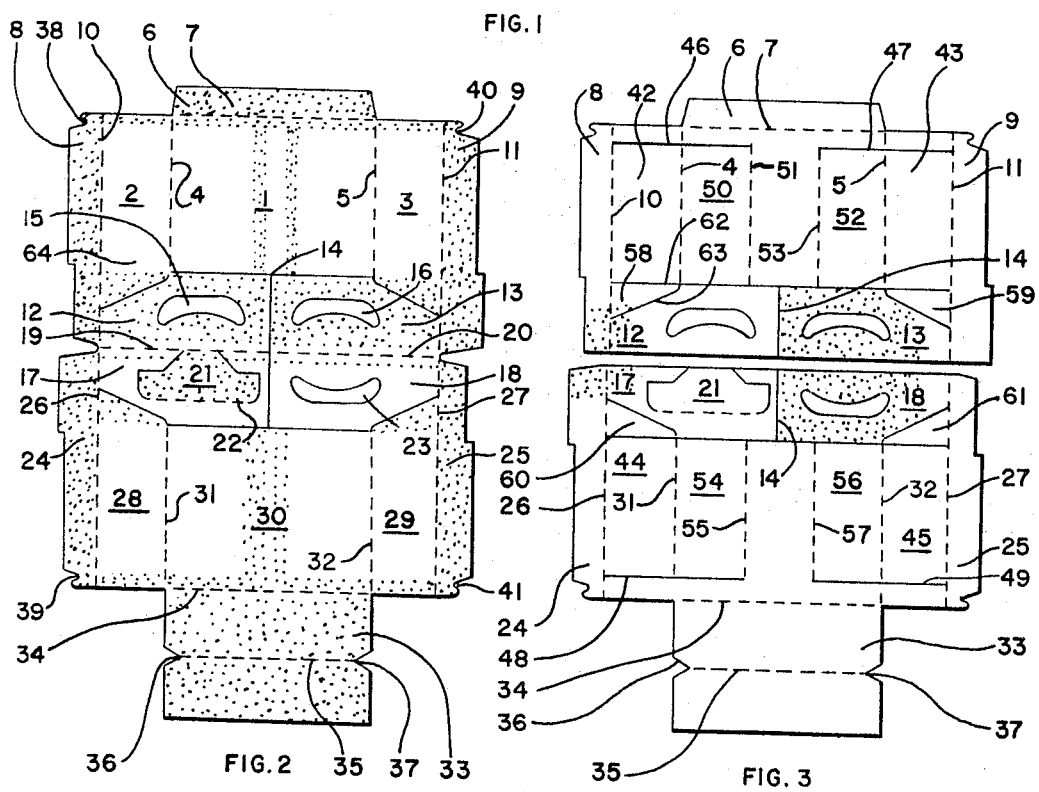

3,447,717
ARTICLE CARRIER WITH REINFORCED END PANELS
Homer W. Forrer, Jonesboro, Ga., assignor to The Mead Corporation, a corporation of Ohio
Filed Dec. 4, 1967, Ser. No. 687,799
Int. Cl. B65d *75/00, 5/48*
U.S. Cl. 220—113                     4 Claims

ABSTRACT OF THE DISCLOSURE

An article carrier is disclosed wherein a main outer blank is used in conjunction with one or more supplementary inner blanks to provide an unusually sturdy article carrier, the inner blank or blanks being adhered in certain areas thereof to corresponding areas of the outer blank so as to provide reinforcement therefor while other areas of the inner blank or blanks are left detached from the corresponding areas of the outer blank so as to provide partitioning structure for the carrier. This partially laminated construction is especially arranged so as to afford reinforcement for the carrier end panels.

---

According to the invention a carrier having bottom, side walls and end panels and a medial partitioning and handle structure together with riser panels formed medially of the carrier at each end thereof to form an interconnection between the handle and the end panels is provided with reinforcement for the carrier end panels. More specifically, each riser panel is at least of partially laminated two-ply construction and one ply of each riser panel is foldably joined to the inner medial edge of each end panel which forms one side of each end wall of the carrier, and a handle panel at least of partially laminated two-ply construction is arranged with each ply thereof foldably joined to one ply of the associated riser panel along the outer end edge of the handle panel. A reinforcing pane folldably joined to one ply of each riser panel is secured in flat face contacting relation with the adjacent end panel so as to afford substantial reinforcement therefor.

Figure 4:
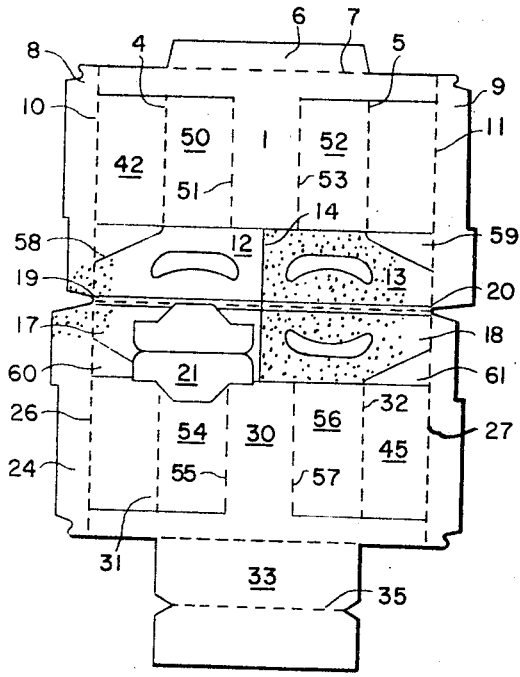
Figure 5:
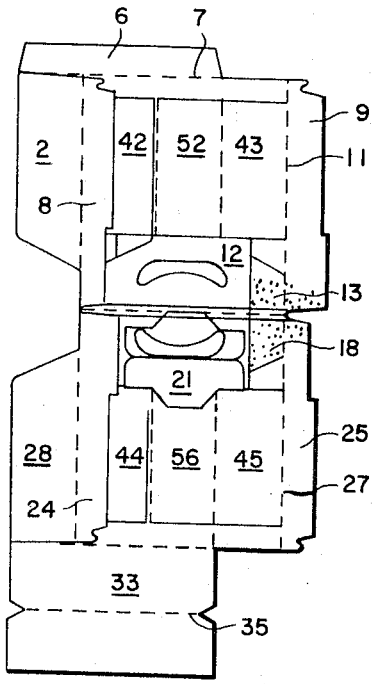
Figure 6:
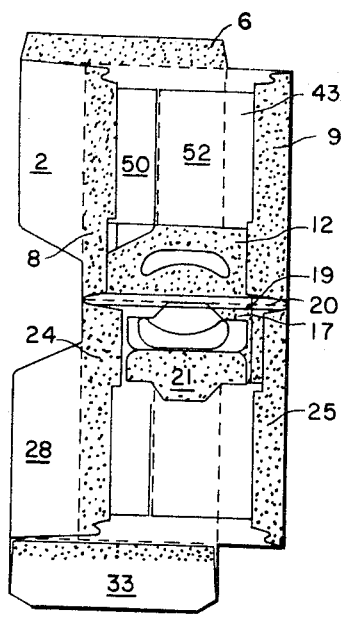
Figure 7:
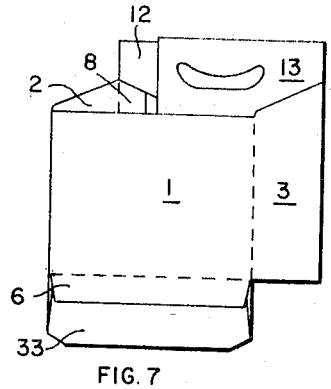

For a better understanding of the invention, reference may be had to the following detailed description taken in conjunction with the accompanying drawing in which FIG. 1 is a perspective view of a completed and set-up carrier constructed according to the invention; FIG. 2 is a plan view of the main outer blank from which the carrier of FIG. 1 is constructed; FIG. 3 is a plan view of two supplemental blanks which are affixed in certain areas thereof to the inner surface of the main blank shown in FIG. 2; FIG. 4 is a composite view of the blank depicted in FIG. 3 affixed thereto; FIGS. 5, 6 and 7 represent folding and gluing operations through which the composite laminated blank of FIG. 4 is manipulated in order to form the completed and collapsed blank as depicted in FIG. 7. Of course, FIG. 7 when set up appears as depicted in FIG. 1.

In the drawings the numeral 1 depicts a side wall of the main blank and the numerals 2 and 3 designate end panels which are foldably joined to the end edges 4 and 5 of side wall 1. A lap panel 6 is foldably joined to the bottom edge 7 of side wall 1. Riser panels 8 and 9 are foldably joined respectively along fold lines 10 and 11 to the side edges of end panels 2 and 3 respectively. Handle panel 12 is foldably joined to riser panel 8 along fold line 10 and handle panel 13 is foldably joined to riser panel 9 along fold line 11. Handle panels 12 and 13 are separated by cut lines 14 and are respectively provided with hand gripping apertures 15 and 16.

The other side of the main blank is of similar construction and comprises handle panels 17 and 18 which are foldably joined to handle panels 12 and 13 respectively along medial fold lines 19 and 20. An auxiliary partitioning panel is struck from handle panel 17 and is designated by the numeral 21. Auxiliary panel 21 is foldably joined to handle panel 17 along fold line 22. Hand gripping aperture 23 is formed in handle panel 18. Riser panels 24 and 25 are foldably joined to the end edges of handle panels 17 and 18 respectively along fold lines 26 and 27. End panels 28 and 29 are foldably joined to riser panels 24 and 25 respectively along fold lines 26 and 27. Side wall panel 30 is foldably joined to end panel 28 along fold line 31 and to the end panel 29 along fold line 32. Bottom wall 33 is foldably joined to the bottom edge of side wall 30 along fold line 34. Bottom panel 33 is provided with a medial fold line 35 at the ends of which a pair of notches 36 and 37 are formed. Notch 36 cooperates, as is well known, with notches 38 and 39 formed in riser panels 8 and 24 respectively while notch 37 of bottom panel 33 cooperates with notches 40 and 41 formed in riser panels 9 and 25 respectively.

The two supplemental blanks depicted in FIG. 3 are affixed to the main blank depicted in FIG. 2 by means of glue applied to the main blank of FIG. 2 as indicated by stippling in that figure. Furthermore, the same numerals are used in FIG. 3 to designate the various parts of the supplemental blanks as are used to designate the parts in FIG. 2 insofar as is feasible. Since certain areas of the supplemental blanks of FIG. 3 are not adhered to the corresponding unstippled areas in FIG. 2, the corresponding parts of the two blanks are not disposed in face contacting relationship when the carrier is set-up. For this reason the panel in FIG. 3 between the fold lines 4 and 10 is designated by a different numeral in FIG. 3, i.e., by the numeral 42. Likewise, the panel between fold lines 5 and 11 is designated by the numeral 43 and the medial panel between fold lines 26 and 31 is designated by the numeral 44 while the panel between fold lines 32 and 27 is designated by the numeral 45. Furthermore, cut lines appear in FIG. 3 which do not appear in FIG. 2 as are designated in FIG. 3 by the numerals 46, 47, 48 and 49.

The transverse cut line 46 defines the bottom edge of medial panel 42 as well as the bottom edge of transverse panel 50 which is disposed between fold line 4 and fold line 51. Similarly, cut line 47 defines the bottom edge of medial panel 43 as well as the bottom edge of transverse partitioning panel 52 which extends between fold line 5 and fold line 53.

Similarly on the opposite side of the carrier cut line 48 defines the bottom edge of medial panel 44 as well as the bottom edge of transverse partitioning panel 54 which extends between the fold line 31 and the fold line 55. In like fashion, the cut line 49 defines the bottom edge of medial panel 45 as well as the bottom edge of transverse partitioning panel 56 which extends between fold line 32 and fold line 57.

With the two supplemental blanks depicted in FIG. 3 affixed to the main blank depicted in FIG. 2 the composite blank appears as depicted in FIG. 4 after the auxiliary medial partitioning panel 21 is folded downwardly along the fold line 22.

According to a principal feature of this invention, the end panels such as 2, 3, 28 and 29, being of single ply construction, are substantially strengthened at their upper edges by reinforcing panels 58, 59, 60 and 61 which are taken from the supplemental blanks depicted in FIG. 3. These small triangular panels during the gluing operation whereby the supplemental panels of FIG. 3 are glued to FIG. 2 are adhered to the upper edges of the end panels such as 2, 3, 28 and 29. Of course these panels are foldably joined to their associated riser panels 8, 9, 24 and 25. All of these reinforcing panels are of identical construction and only one such panel is here described in detail. For example, reinforcing panel 58 is bordered along its left hand edge by the fold line 10 by which the reinforcing panel is foldably joined to the riser panel 8. Reinforcing panel 58 is separated from the medial partitioning panel 42 by cut line 62 and from handle panel 12 by cut line 63. Thus, with reinforcing panel 58 securely affixed to the upper portion of end panel 2 as generally designated by the numeral 64 in FIG. 2 a strong and sturdy construction for the end of the carrier is provided.

In order to manipulate the composite blank as depicted in FIG. 4 into the collapsed condition depicted in FIG. 7, an application of glue is first applied as indicated by stippling in FIG. 4. Following this application of glue, riser panels 8 and 24 are lifted upwardly and swung toward the right along their respective fold lines 10 and 26 and here to handle panels 12 and 17. Simultaneously, the end panels 2 and 28 are elevated and swung toward the right along their respective fold lines 4 and 31. Simultaneously with this folding operation, the panels 42 and 44 of the supplemental blank swing upwardly and toward the right while remaining in the plane of the handle panels 12 and 17. During this folding operation, the transverse partitioning panels 50 and 54 hinge about their fold lines 51 and 55 and swing into flat face contacting relation with the center portions of the side walls 1 and 30. Of course the handle panels 12 and 17 become adhered to the inside surfaces of handle panels 13 and 18. The medial partitioning panels 42 and 44 upon completion of the folding operation depicted in FIG. 5 lie in flat face contacting relation with and atop the transverse partitioning panels 50 and 54 respectively.

In order to manipulate the blank as depicted in FIG. 5 into the condition depicted in FIG. 6 and application of glue is first made as indicated by stippling in FIG. 5. Following this application of glue, the riser panels 9 and 25 are folded upwardly and toward the left along fold lines 11 and 27 respectively so that the inner ends of riser panels 9 and 25 become adhered to the right hand ends of handle panels 13 and 18 respectively. The bottom panel 35 is collapsed upon itself by folding the lower portion thereof upwardly and forwardly along the medial fold line 35. The blank then appears as depicted in FIG. 6.

An application of glue is then made to the blank as indicated by stippling in FIG. 6 following which side wall 1 along with glue flap 6, end panels 2 and 3, riser panels 8 and 9, panels 42, 50, 52, 43 and reinforcing panels 58 and 59 together with handle panels 12 and 13 are elevated and swung forwardly along the fold lines 19 and 20 so that the carton then appears in completed and collapsed form as depicted in FIG. 7.

In order to set the carton up, it is simply necessary to secure the side walls 1 and 2 and associated structure against sidewise movement toward the left and to exert a force toward the left against the end panels 3 and 29. The locking notch 37 engages the locking notches 40 and 41 and the locking notch 36 engages the locking notches 38 and 39. The carton is then secured in its set-up condition as depicted in FIG. 1.

As is obvious from FIGS. 1 and 3 for example, reinforcing panel 58 is foldably joined along fold line 10 to riser panel 8 and since the reinforcing panel 58 is firmly affixed to the upper edge of end panel 2 substantial strengthening thereof is afforded in a region where substantial stress is applied to the carrier under normal service conditions. Furthermore substantial strengthening of the side walls is afforded by the transverse partitions 50, 52, 54 and 56 as is obvious to one skilled in the art.

The medial partition panel 21 extends sufficiently far below the lower edges of the handle panels 12, 13, 17 and 18 to afford adequate separation between the middle articles on each side of the handle. The bottom edges of the side walls and of the end panels are reinforced by the laminated strips best shown in FIG. 3 and disposed between the cut lines 46, 47 and the bottom edges of the carrier side walls and end panels. Similarly, the laminated strips between the cut lines 48 and 49 and the bottom portions of the carrier side walls and end panels afford substantial reinforcement on the opposite side of the carrier.

The embodiments of the invention in which an exclusive property or privilege is claimed are defined as follows:

1. An article carrier comprising a bottom wall, side walls, foldably joined to the side edges of said bottom wall, end panels foldably joined to the end edges of said side walls and extending transversely inward therefrom, a pair of riser panels at each end of the carrier, each of said riser panels being of partially laminated two-ply construction and having one ply thereof foldably joined to an edge of one of said end panels medially of the carrier, a handle panel at least of partially laminated two-ply construction and arranged with each ply thereof foldably joined to one ply of each of said riser panels along an outer end edge of each of said handle panels, and a reinforcing panel foldably joined to one ply of each of said riser panels and secured in flat face contacting relation with the adjacent one of said end panels.

2. A carrier according to claim 1 wherein each of said reinforcing panels is foldably joined to one ply of each of said riser panels along a fold line which is coincident with said outer end edge of the associated handle panel.

3. A carrier according to claim 1 wherein each of said reinforcing panels is secured to the inner surface of the associated end panel.

4. An article carrier according to claim 1 wherein a medial panel of single ply construction is foldably joined to the ply of each of said riser panels to which the associated reinforcing panel is foldably joined along a fold line which is coincident with said outer end edge of the associated handle panel.

References Cited

UNITED STATES PATENTS

| 2,712,397 | 7/1955 | Kowal | 220—113 |
| 2,974,827 | 3/1961 | Levkoff | 220—113 |
| 3,011,677 | 12/1961 | Struble | 220—113 |
| 3,140,797 | 7/1964 | Arneson | 220—113 |
| 3,198,380 | 8/1965 | Gish et al. | 220—115 |
| 3,232,477 | 2/1966 | Woodling | 220—113 |
| 3,315,838 | 4/1967 | Forrer | 220—113 |

DAVIS T. MOORHEAD, *Primary Examiner.*

U.S. Cl. X.R.

129—28